US012748615B2

(12) United States Patent
Keshari et al.

(10) Patent No.: US 12,748,615 B2
(45) Date of Patent: Sep. 29, 2026

(54) PREDICTING WORKER INSTANCE COUNT FOR CLOUD-BASED COMPUTING PLATFORMS

(71) Applicant: Microsoft Technology Licensing, LLC, Redmond, WA (US)

(72) Inventors: Neha Keshari, Bothell, WA (US); Abhisek Pan, Bellevue, WA (US); David Allen Dion, Bothell, WA (US); Brendon Machado, Seattle, WA (US); Karthik Subramaniam Hariharan, Seattle, WA (US); Karthikeyan Subramanian, Redmond, WA (US); Thomas Moscibroda, Bellevue, WA (US); Karel Trueba Nobregas, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 517 days.

(21) Appl. No.: 18/365,922

(22) Filed: Aug. 4, 2023

(65) Prior Publication Data

US 2025/0045088 A1 Feb. 6, 2025

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS 11,113,120 B1 9/2021 Greenfield et al.
2011/0029970 A1* 2/2011 Arasaratnam ....... G06F 9/45558 718/1
2015/0207851 A1* 7/2015 Nampally ............. H04L 67/562 709/217
2017/0199564 A1 7/2017 Saxena et al.
2018/0302340 A1 10/2018 Alvarez Callau et al.
2019/0243686 A1* 8/2019 LaBute ................. G06F 9/5027
(Continued)

FOREIGN PATENT DOCUMENTS

| | | | |
|---|---|---|---|
| CN | 108270805 | B | 3/2021 |
| KR | 20210149576 | A | 12/2021 |
| WO | 2023287969 | A1 | 1/2023 |

OTHER PUBLICATIONS

International Search Report and Written Opinion received for PCT Application No. PCT/US2024/038258, Nov. 4, 2024, 18 pages.
(Continued)

*Primary Examiner* — Wynuel S Aquino
(74) *Attorney, Agent, or Firm* — ArentFox Schiff LLP

(57) ABSTRACT

Described are examples for recommending increase in worker instance count for an availability zone in a cloud-based computing platform. A machine learning (ML) model can be used to predict a time series forecast of a workload for the availability zone in a future time period. A predicted number of worker instances to handle the predicted workload can be computed, and if the number of worker instances in the availability zone is less than the predicted number of worker instances, a recommendation to increase the number of worker instances in the availability zone can be generated.

20 Claims, 4 Drawing Sheets

(56) References Cited

U.S. PATENT DOCUMENTS

| | | | | |
|---|---|---|---|---|
| 2019/0342184 | A1 | 11/2019 | May | |
| 2020/0074323 | A1* | 3/2020 | Martin | G06F 17/142 |
| 2022/0253790 | A1 | 8/2022 | Volkov et al. | |
| 2023/0071347 | A1 | 3/2023 | Hudis et al. | |
| 2023/0153165 | A1* | 5/2023 | Higginson | G06F 11/3447 718/104 |
| 2023/0214308 | A1 | 7/2023 | Chen | |
| 2023/0342658 | A1* | 10/2023 | Tripathi | G06F 9/5072 |
| 2023/0401089 | A1* | 12/2023 | Armangau | G06F 9/5038 |
| 2024/0289111 | A1* | 8/2024 | Kaveri Poompatnam Chandrasekaran | G06F 9/455 |
| 2025/0021388 | A1* | 1/2025 | Agrahari | G06F 9/50 |

OTHER PUBLICATIONS

"Applying Machine Type Recommendations for VM Instances", Retrieved from: https://cloud.google.com/compute/docs/instances/apply-machine-type-recommendations-for-instances, Retrieved On: May 2, 2023, 10 Pages.

"Horizontal Autoscaling", Retrieved from: https://cloud.google.com/dataflow/docs/horizontal-autoscaling, Retrieved On: Jun. 15, 2023, 7 Pages.

"Viewing Resource Recommendations", Retrieved From: https://docs.aws.amazon.com/compute-optimizer/latest/ug/viewing-recommendations.html, Retrieved On: May 2, 2023, 1 Page.

Liu, et al., "Worker Recommendation for Crowdsourced Q&A Services: A Triple-Factor Aware Approach", In Proceedings of the VLDB Endowment, vol. 11, Issue 3, Nov. 1, 2017, pp. 380-392.

Yadav, et al., "Resource Provisioning Through Machine Learning in Cloud Services", In Arabian Journal for Science and Engineering, vol. 47, Jul. 24, 2021, pp. 1483-1505.

International Preliminary Report On Patentability received for PCT Application No. PCT/US2024/038258, mailed on Feb. 19, 2026, 13 pages.

* cited by examiner

PREDICTING WORKER INSTANCE COUNT FOR CLOUD-BASED COMPUTING PLATFORMS

BACKGROUND

Cloud-based computing platforms are provided where applications can execute, access storage, control or receive input from devices, etc. over multiple distributed network nodes. The network nodes, which can be virtual machines (VMs) executing on separate devices (e.g., servers) are connected to one another via one or more network connections that may include the Internet. Applications can be redundantly provided across the cloud-based computing platform, or can otherwise provide services using multiple network nodes to allow concurrent access by many users or associated client devices. Indeed, some corporations provide public cloud-based computing platform access to entities as desired to facilitate cloud-based deployment of applications. The public cloud-based computing platforms, for example, may include a complex or vast architecture of nodes including data centers across a country or globe, where each data center has many network nodes connected via various network architectural nodes.

A cloud-based computing platform can include an allocation system including a group of microservices that can map each virtual-machine (VM) request received in the cloud-based computing platform to a server in an inventory of servers. Scalability and performance of the allocation system can impact the quality of service provided by the cloud-based computing platform. A single logical instance of the allocation system can handles requests for a given availability zone, where the availability zone can host a vast number of servers (e.g., a few hundred thousand servers), and/or can accept a vast number of allocation requests (e.g., millions of VM allocation requests per day). The allocation agent service in the allocation system can be responsible for selecting a server for every VM request through a sophisticated multi-objective optimization algorithm. This service can deploy multiple worker instances (e.g., processes) within an availability zone, with each instance running on a separate server, which could be hosting other control plane services. Each instance can have multiple allocation agents (e.g., threads) to perform the allocation task. This design of allocation agents can facilitate load-balancing by distributing the load among more workers. Each allocation decision can be persisted by the worker instances in a backing single-writer database service.

Each worker instance can include a priority queue to enqueue incoming VM or other resource requests, which can then be dequeued and processed by the agents. When there is an increase in workload, worker instances can start receiving additional requests, which can lead to an increase in the queue length as well as the queue wait time for requests in the worker instance, potentially leading to throttling of allocation requests. For example, if a request remains in the queue for longer than a specified time (for example, 60 seconds), the request can expire due to a timeout exception before being throttled. If a request is throttled, the allocation can be retried one or more times, after which it may fail with throttling errors, negatively impacting the customer. Even if an allocation request succeeds after several retries, it can still have a negative impact on the customer due to the high total allocation time. High severity incidents can be triggered when workload spikes, which can cause throttling, increased queue depth, or allocation slowness. In present cloud-based computing platforms, an engineering team manually investigates the root cause of these issues and, as per the investigation findings, may increase the number of worker instances to distribute the increased workload. Such reactive and manual decisions to increase the number of worker instances may often be ineffective, and at best can only partially mitigate the degradations already caused by the workload spikes. Additionally, provisioning the required servers can take days depending on inventory availability. This can further exacerbates the workload increase problem, impacting customers VM deployment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a device for recommending increase in worker instance count for an availability zone in a cloud-based computing platform is provided that includes one or more memories storing instructions, and one or more processors coupled to the one or more memories. The one or more processors are configured to execute the instructions to provide resource allocation information as input to a machine learning (ML) model to receive an output of a time series forecast of a workload for the availability zone in a future time period, compute a predicted number of worker instances in the availability zone for handling the workload in the future time period, and when a number of worker instances in the availability zone is less than the predicted number of worker instances, generate a recommendation to increase the number of worker instances in the availability zone.

In another example, a method for recommending increase in worker instance count for an availability zone in a cloud-based computing platform is provided. The method includes predicting, using a machine learning (ML) model, a time series forecast of a workload for the availability zone in a future time period, determining whether a number of worker instances in the availability zone is sufficient for satisfying the workload in the future time period, and based on determining that the number of worker instances is not sufficient, generating a recommendation to increase the number of worker instances in the availability zone.

In another example, a non-transitory computer-readable device is provided that stores instructions that, when executed by at least one computing device, cause the at least one computing device to perform operations for recommending increase in worker instance count for an availability zone in a cloud-based computing platform. The operations includes predicting, using a machine learning (ML) model, a time series forecast of a workload for the availability zone in a future time period, determining whether a number of worker instances in the availability zone is sufficient for satisfying the workload in the future time period, and based on determining that the number of worker instances is not sufficient, generating a recommendation to increase the number of worker instances in the availability zone.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
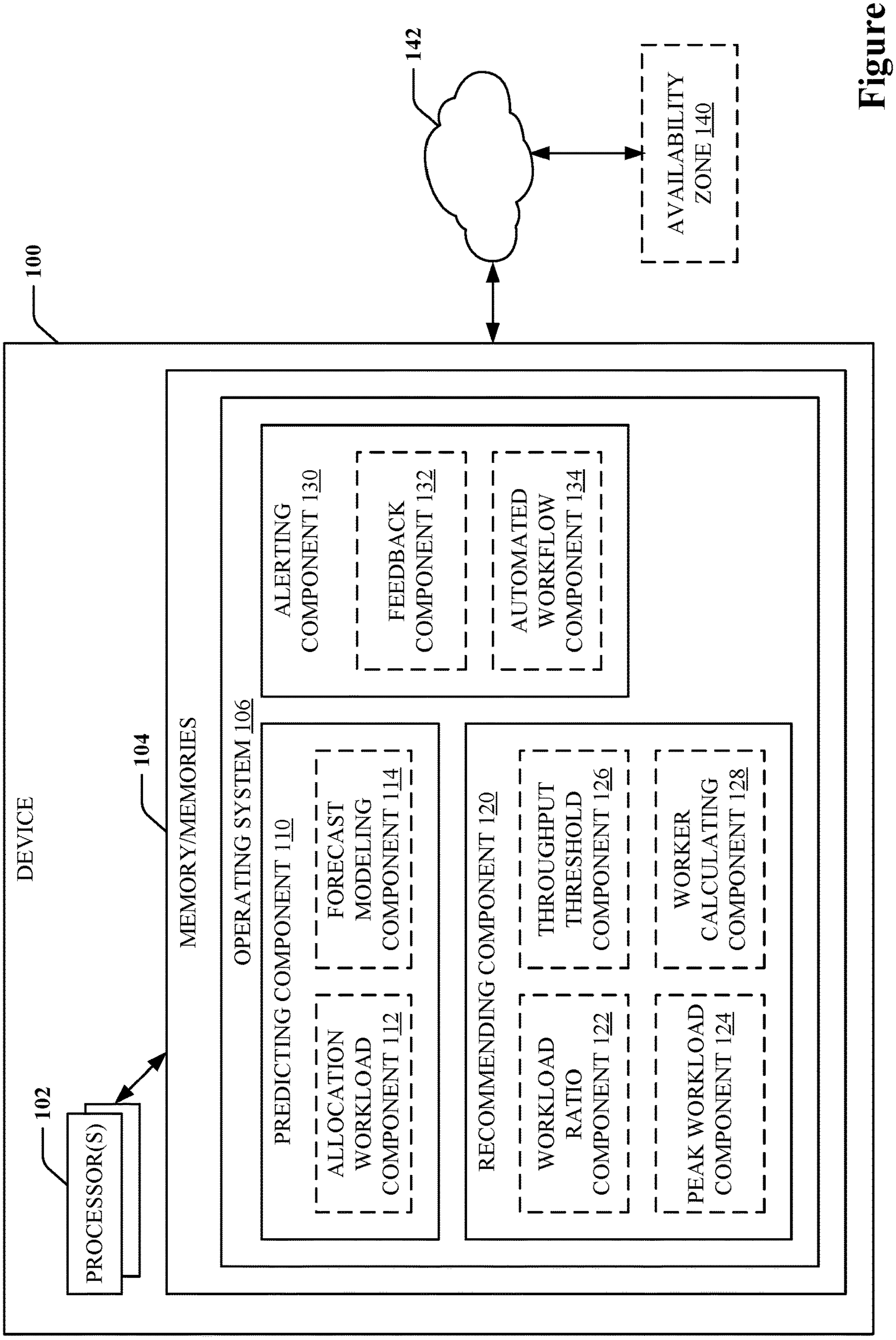
FIG. 1 is a schematic diagram of an example of a device for performing functions related to computing a worker instance count to handle a predicted workload in an availability zone for a cloud-based computing platform, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to predicting worker instance count for a cloud-based computing platform. For example, scale and performance metrics of the allocation system can be tracked and scaled to facilitate recommending increase in the worker instance count to handle predicted additional workload. To effectively manage scaling issues, such as allocation request throttling, aspects described herein relate to differentiating between genuine customer demand and system disruptions in generating the predictions. In some cases, adding more worker instances without differentiating between genuine customer demand and system disruptions may lead to suboptimal performance for the cloud-based computing platform. For example, when the throttling is due to underlying platform issues, adding new worker instances can start to consume large amounts of compute resources (e.g., server memory) without improving the quality of service. Accordingly, aspects described herein relate to generating predictions for worker instance count by considering or inferring the reason for throttling and providing an appropriate solution. In some examples, a machine learning (ML) model can be employed within the allocation system to generate a workload forecast. Considering signals such as forecasted workload, throttling instances, throughput, etc., an alert or indication to increase the number of worker instances in the availability zone can be proactively provided. This can allow for pre-order of servers to provide the worker instances, providing a buffer time to address any potential capacity issue in an availability zone. In this regard, the number of worker instances can be proactively increased to handle the predicted increase in workload, which can improve customer experience, quality-of-service, throughput, etc. by increasing the worker instance count ahead of the predicted increase in workload.

In this regard, for example, predicting worker instance count can allow for considering competing business priorities such as customer satisfaction, customer priorities, platform scalability, system reliability, and throttling failures during virtual machine (VM) deployment in determining the number of worker instances to use in the availability zone. In addition, a system that predicts the worker instance count in this regard can provide an automated end-to-end system that can produce a recommendation signal to increase worker instance count, where the signal is completely and automatically generated, thus removing the manual, tedious, and error-prone touch points in a cloud-based computing platform. Moreover, for example, the systems and methods described herein can facilitate predicting the future capacity in terms of servers required for the allocation system, which allows for a proactive planning of the resource for scaling the allocation system on time.

Figure 2:
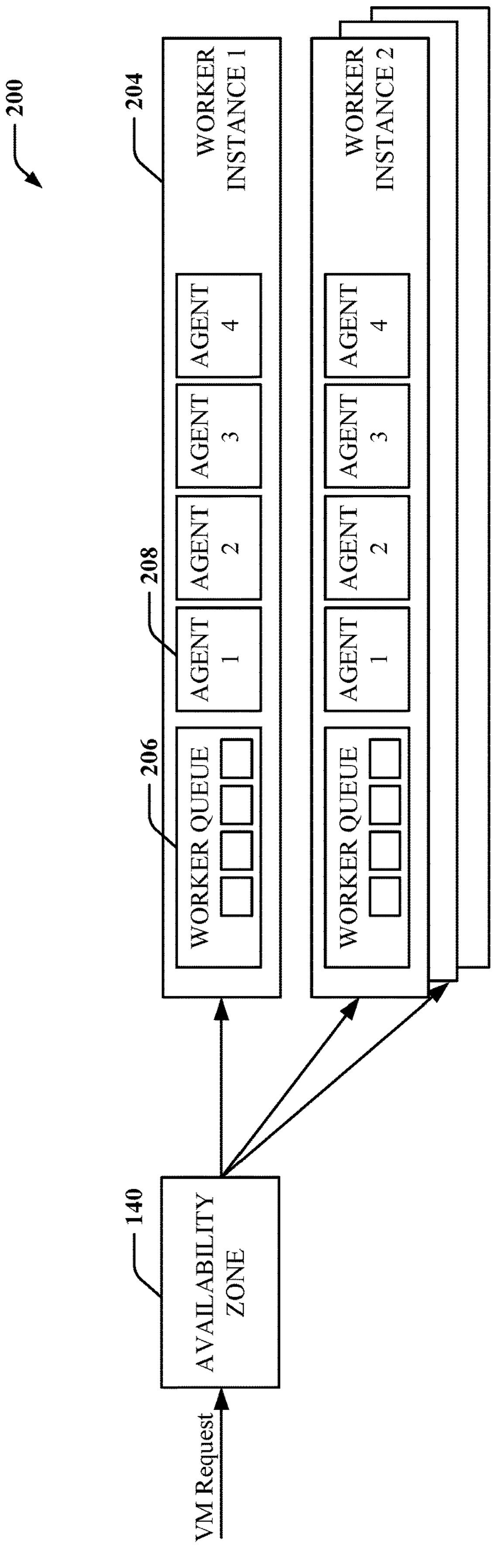
FIG. 2 is a schematic diagram of an example of a portion of a cloud-based computing platform, in accordance with aspects described herein.
Figure 3:
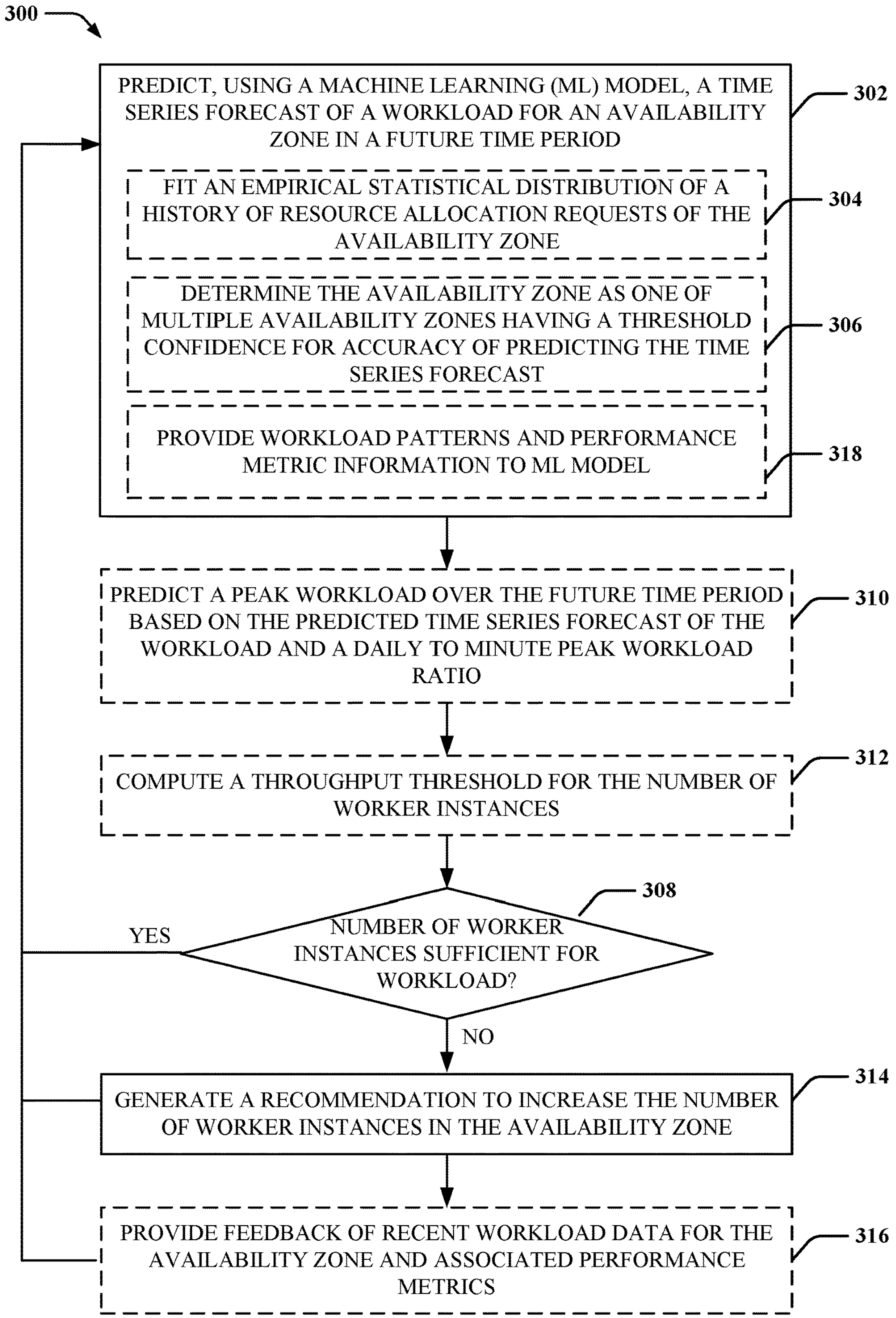
FIG. 3 is a flow diagram of an example of a method for predicting or recommending worker instance count for an availability zone, in accordance with aspects described herein.

Turning now to FIGS. 1-4, examples are depicted with reference to one or more components and one or more methods that may perform the actions or operations described herein, where components and/or actions/operations in dashed line may be optional. Although the operations described below in FIG. 3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

FIG. 1 is a schematic diagram of an example of a device 100 (e.g., a computing device) for performing functions related to computing a worker instance count to handle a predicted workload in an availability zone for a cloud-based computing platform, in accordance with aspects described herein. In an example, device 100 can include one or more processors 102 and/or memory/memories 104 configured to execute or store instructions or other parameters related to providing an operating system 106, which can execute one or more applications or processes. For example, processor(s) 102 and memory/memories 104 may be separate components communicatively coupled by a bus (e.g., on a motherboard or other portion of a computing device, on an integrated circuit, such as a system on a chip (SoC), etc.), components integrated within one another (e.g., processor(s) 102 can include the memory/memories 104 as an on-board component), and/or the like. Memory/memories 104 may store instructions, parameters, data structures, etc. for use/execution by processor(s) 102 to perform functions described herein. In another example, processor(s) 102 and/or memory/memories 104 can be distributed over multiple devices or physical computing nodes in a network (e.g., in a cloud-based computing platform) for providing the functions of the various components described herein.

In one example, the operating system 106 can execute one or more applications or processes, such as, but not limited to, a predicting component 110 for predicting a workload for an availability zone in a cloud-based computing platform in a future time period, a recommending component 120 for generating a recommendation for increasing a number of worker instances in the availability zone in the future time period, and/or an alerting component 130 for providing one or more alerts related to increasing the worker instance count in the availability zone. For example, device 100 can communicate with the availability zone 140 via a network 142 to receive allocation request history from the availability zone 140, which can be used to predict the workload in the availability zone 140 in the future time period, determine a number of worker instances to handle the predicted workload, etc. In another example, one or more of the components 110, 120, 130 can be part of the availability zone—e.g., on a server providing the availability zone—for providing the corresponding functions described herein.

In an example, predicting component 110 can optionally include an allocation workload component 112 for obtaining allocation request information for an availability zone 140 in an allocation system of a cloud-based computing architecture, and/or a forecast modeling component 114 for generating a time series forecast model or prediction of a workload for the availability zone 140 in a future time period (e.g., based on a history of allocation requests at the availability zone 140). In an example, recommending component 120 can optionally include a workload ratio component 122 for computing a ratio for the workload, such as by converting a workload history from a first time period (e.g., per day) to a second time period (e.g., per minute), and computing the ratio of the second time period to the first time period, a peak workload component 124 for computing, based on the ratio, a peak workload based on the predicted workload and the ratio, a throughput threshold component 126 for determining a throughput threshold achievable by a current number of worker instances, and/or a worker calculating component 128 for calculating a number of worker instances to satisfy the predicted workload based on the peak workload and the throughput threshold. In an example, alerting component 130 can optionally include a feedback component 132 for providing a feedback indication of a number of worker instances to add, and/or an automated workflow component 134 for requesting deployment or provisioning of additional servers to provide the additional worker instances.

FIG. 2 is a schematic diagram of an example of a portion of a cloud-based computing platform 200, in accordance with aspects described herein. An availability zone 140 is included as a part of an allocation system of the cloud-based computing platform 200, where the availability zone 140 can receive one or more VM requests (or other resource allocation requests). The availability zone 140 can include multiple worker instances 204, which can each correspond to a computing node, such as a server or other physical device to provide resources for the VM request. The availability zone 140 can load balance the resource allocation requests across the various worker instances 204. Each worker instance 204 can include a worker queue 206 for storing VM requests (or other resource allocation requests) and multiple agents 208, which can be processes that provide the resources for the VM requests, for executing associated processes, etc. As described, for example, each worker instance 204 can concurrently support a threshold number of resource allocation requests, and when the workload for the availability zone 140 increases, the availability zone 140 may, in some cases, benefit from adding additional worker instances 204 (e.g., additional servers or other computing nodes) to handle the additional resource allocation requests. In accordance with aspects described herein, the workload for the availability zone 140 can be predicted in a future time period, which can include predicting the peak workload and throughput, and a number of worker instances to support the workload can be computed. If the computed number of worker instances is less than the number of worker instances 204 in the availability zone 140, a recommendation to add worker instances can be generated for the availability zone 140.

FIG. 3 is a flowchart of an example of a method 300 for predicting or recommending worker instance count for an availability zone, in accordance with aspects described herein. For example, method 300 can be performed by a device 100 and/or one or more components thereof to facilitate predicting the workload for the availability zone and/or recommending increase in worker instance count for the availability zone.

In method 300, at action 302, a time series forecast of a workload for an availability zone in a future time period can be predicted using a ML model. In an example, predicting component 110, e.g., in conjunction with processor(s) 102, memory/memories 104, operating system 106, etc., can predict, using the ML model, the time series forecast of the workload for the availability zone (e.g., availability zone 140) in the future time period. For example, predicting component 110 can provide inputs to the ML model, such as historical resource allocation request (e.g., VM request) information, which may include a number of resource allocation requests fulfilled by the availability zone 140 in a previous time period, a number of worker instances or agents active (e.g., currently or in the previous time period), a statistical trend or seasonality of such information, etc. In an example, based on the input, the ML model can provide an output of a workload metric, such as the number of resource allocation requests, or similar metrics, predicted for the future time period.

For example, as described, the cloud-based computing platform can include an allocation system as a platform service where multiple internal requests are created for each customer request. The various types of requests that may occur during the process of virtual machine allocation can include an original allocation request, lightweight probe requests to estimate success possibilities in multiple zones, retries that happen when the original request fails due to throttling, collisions, staleness of the instance's view of the inventory, etc. The request load on the allocation system can include the direct customer requests and can also encompass these various other requests that arise from those customer requests. All requests can be stored in the worker instance queues and served by the allocation agents. Accordingly, for example, allocation workload component 112 can provide information regarding all the requests to the ML model for predicting the workload in the future time period. The information can include the actual requests, the number of requests, the number of each type of request, etc. and may be over a previous time period, as described herein (e.g., a thirty-day or one-month history).

For example, the allocation system workload can follow a pattern with high demand on weekdays and low on weekends. There can be increasing or decreasing workload trends or unexpected spikes due to large customer deployments or holiday season demand (e.g., in certain months or other time periods) or platform issues causing multiple retries. Forecast modeling component 114 can use a time series model that can handle multiple seasonality and give more importance to the recently observed workload to provide more accurate prediction or forecasting of the allocation system workload. As each availability zone has its own set of worker instances and can have a different pattern of deployment, the workload forecast is produced at availability zone level. Forecast modeling component 114 can train the forecast model for availability zones with a certain timespan of workload history (e.g., at least 12 weeks of workload history). By training the forecast model in this regard, workload increases due to customer demand can be more frequent or consistent or predictable than workload increases due to system disruption. The forecast model being a time series model can accordingly favor or more heavily weigh the workload increases due to customer demand over those due to system disruption.

In an example, predicting component 110 can continually predict the workload for the availability zone 140 as real workload data of the availability zone 140 is observed. As described, the workload data can include the history of workload data, statistical trend, seasonality of workload, etc., where the workload data can be resource allocation information, worker instance information, or other workload data or measurements. For example, forecast modeling component 114 can use the ML model to predict the future workload for the availability zone 140 based on the historical workload records by a time series prediction model for the availability zone 140.

In one example, in predicting the workload at action 302, optionally at action 304, an empirical statistical distribution of the history of resource allocation requests of the availability zone can be fit. In an example, predicting component 110, e.g., in conjunction with processor(s) 102, memory/memories 104, operating system 106, etc., can fit the empirical statistical distribution of the history of resource allocation requests of the availability zone, which can be for a given historical time period (e.g., thirty days or one month, etc.). In addition, for example, the statistical distribution can be per type of allocation request to distinguish actual allocation requests, retries, etc. from requests due to underlying platform issues. In any case, the statistical distribution can provide insight into the resource allocation requests in a recent history to facilitate predicting future resource allocation requests, as described herein.

In one example, in predicting the workload at action 302, optionally at action 306, the availability zone can be determined as one of multiple availability zones having a threshold confidence for accuracy of predicting the time series forecast. In an example, predicting component 110, e.g., in conjunction with processor(s) 102, memory/memories 104, operating system 106, etc., can determine the availability zone as one of multiple availability zones having the threshold confidence for accuracy of predicting the time series forecast, and can predict the workload for the availability zone (and/or for the multiple availability zones) based on this confidence. For example, predicting component 110 can exclude low predictability and/or low confidence availability zones in predicting the workload and can use the most confident availability zones to generate a more accurate forecast.

In method 300, at action 308, it can be determined whether the number of worker instances in the availability zone is sufficient for the predicted workload. In an example, recommending component 120, e.g., in conjunction with processor(s) 102, memory/memories 104, operating system 106, etc., can determine whether the number of worker instances in the availability zone 140 is sufficient to handle the predicted workload. For example, recommending component 120 can compute a number of worker instances that may be needed to handle the predicted workload, and can determine whether the current number of worker instances in the availability zone 140 is at least that number or whether additional worker instances are to be provisioned to handle the additional workload as predicted. As described, for example, recommending component 120 can provide additional performance and scale metrics along with the predicted workload to recommend a worker instance count for the availability zone 140 to scale with workload growth.

In method 300, optionally at action 310, a peak workload over the future time period can be predicted based on the predicted time series forecast of the workload and a daily to minute peak workload ratio. In an example, recommending component 120, e.g., in conjunction with processor(s) 102, memory/memories 104, operating system 106, etc., can predict the peak workload over the future time period based on the predicted time series forecast of the workload and a daily to minute peak workload ratio. For example, workload ratio component 122 can compute the daily to minute peak workload ratio or other similar time period based ratio for the workload. To better estimate minute-level peak workload, a daily workload metric can be forecast to minute-level data. For example, workload ratio component 122 can consider workload data over a previous time period (e.g., last month) to calculate the ratio of daily workload to minute-level peak workload. For example, rather than using on a maximum value, which may be noisy, workload ratio component 122 can use a high percentile of the workload data (e.g., 99.5 percentile of per-minute workload) over the course of a day to compute the daily to minute peak ratio. This can prevent the calculation from being impacted by sporadic spikes in workload. Workload ratio component 122 can compute this ratio at a daily granularity, and can determine the daily to minute peak ratio based at least in part on identifying the most frequent occurrence of daily workload to minute-level peak ratio in the previous time period (e.g., last one month). Using this ratio can facilitate more accurate estimation of minute-level peak workload based on daily workload forecast received from the predicting component 110.

In an example, peak workload component 124 can determine the predicted peak workload based on the daily to minute peak ratio, e.g., as the predicted workload from the predicting component 110 multiplied by the daily to minute peak workload ratio. For example, peak workload component 124 can determine the predicted peak workload as the maximum value for a day in a range of days (e.g., one month) of the predicted workload from the predicting component 110 multiplied by the daily to minute peak workload ratio. The workload of the allocation system can be prone to sudden spikes, which can occur within a very short time span (e.g., 1 minute). Such spikes can cause an increase in the load at the worker instance level, implying that worker instances experience a surge in the number of requests received, resulting in a higher queue depth and wait time. As the minute level workload rises, it can cause problems in the worker instance queue and lead to throttling. Therefore, peak workload component 124 can predict the peak workload based on the minute level workload for each of multiple days to enable the allocation system to handle the spikes effectively. This estimation can be achieved by using a metric based on the maximum projected workload in the next one month and daily to minute peak ratio computed by the workload ratio component 122.

In method 300, optionally at action 312, a throughput threshold for the number of worker instances can be computed. In an example, recommending component 120, e.g., in conjunction with processor(s) 102, memory/memories 104, operating system 106, etc., can compute the throughput threshold for the number of worker instances of the availability zone 140. For example, throughput can refer to the amount of workload handled by each worker instance per minute, and the throughput threshold can represent the maximum workload that a worker instance can handle without impacting the performance of the allocation system. Throughput threshold component 126 can determine the throughput threshold based on performance and scale metrics such as throttling, total allocation time, and/or number of timeout exceptions. As throttling can have significant impact on customer experience by causing allocation failures, throughput threshold component 126 can prioritize this metric when calculating the threshold. In an example throughput threshold component 126 can compute the throughput threshold in each of multiple availability zones.

For example, throughput threshold component 126 can compute the threshold at least in part by creating throughput bins and measuring the percentage of throttling and timeout exceptions as well as the total allocation time per bin. Analyzing the metrics in different throughput bins can facilitate observation of how the metrics can vary as the bin values increase. In an example, throughput threshold component 126 can identify the lower throughput bin value where the number of throttling and timeout exceptions is greater than or equal to a percentage (e.g., 0.1%) as the throughput threshold. In zones where throttling is not present, throughput threshold component 126 can derive the threshold based on the total allocation time, which can consider the service allocation time and the worker instance queue wait time. Based on a target of a certain time period (e.g., 60 seconds) set for the allocation, throughput threshold component 126 can identify the lower throughput bin value where the total allocation time reaches a second time period, less than the initial time period (e.g., 50 seconds-10 seconds lower than the set target) as the throughput threshold. For example, if throttling, timeout exception, or total allocation time less than the second time period is not present, throughput threshold component 126 can consider the highest observed throughput value as the throughput threshold for an availability zone.

In an example, worker calculating component 128 can calculate the number of worker instances for handling the predicted workload based on the predicted peak workload and the throughput threshold, and recommending component 120 can determine whether additional worker instances are needed based on the calculated number of worker instances. For example, as described, recommending component 120 can determine the maximum peak workload per minute that the allocation system is likely to experience in each availability zone, which can be calculated as the allocation system minute peak. The recommending component 120 can also determine the maximum workload that can be handled by each worker instance in that availability zone, which can be calculated as the throughput threshold. Worker calculating component 128 can divide the allocation system minute peak by the throughput threshold to obtain an indication of a number of worker instances to distribute the increased workload effectively and ensure load-balancing in the availability zone 140.

If it is determined that the number of worker instances is sufficient for the predicted workload, at action 308, then the method can proceed to action 302 to continue predicting the workload based on real time workload data (e.g., resource allocation information, worker instance information, etc.), as described above. This process can continue in perpetuity for the availability zone to constantly monitor and determine when or if additional worker instances are needed to handle predicted increase in workload.

If it is determined that the number of worker instances is not sufficient for the predicted workload, at action 308, then at action 314, a recommendation to increase the number of worker instances in the availability zone can be generated. In an example, alerting component 130, e.g., in conjunction with processor(s) 102, memory/memories 104, operating system 106, etc., can generate the recommendation to increase the number of worker instances in the availability zone. As described, for example, the workload prediction can be for a future time period that is far enough in advance to allow additional servers to be provisioned to provide the worker instances for the increased workload prediction. For example, feedback component 132 can create the recommendation as feedback for display or reporting on an interface, via an email or pop-up alert, etc. In another example, automated workflow component 134 can create the recommendation as a workflow action to provision one or more additional servers to provide the worker instance(s). For example, alerting component 130 can generate an incident alert for an allocation system team whenever a recommendation to increase worker instance count is generated. These alerts can be generated according to a service time frame (e.g., weekly), allowing the service team to take action (e.g., acquire, provision, and/or deploy the additional servers for use in the availability zone) based on the recommendations.

In method 300, optionally at action 316, feedback of recent workload data for the availability zone and associated performance metrics can be provided. In an example, alerting component 130, e.g., in conjunction with processor(s) 102, memory/memories 104, operating system 106, etc., can provide feedback of the recent workload data for the availability zone and the associated performance metrics. For example, the alerting component 130 can closely monitor various metrics used in the worker instance count calculation, such as workload forecast performance key performance indicator (KPI) (e.g., mean absolute percentage error (MAPE), throughput threshold, etc. For example, to ensure the accuracy or desirability of these metrics, alerting component 130 can trigger an automated alert whenever a degradation is detected, where the alert can include an alert displayed or reported via an interface, an email, pop-up, etc. This can create a valuable feedback loop to facilitate investigation of any issues or regressions and make adjustments to the predicting component 110 and/or recommending component 120. In one example, alerting component 130 can provide the feedback to the ML model to allow the ML model to adjust the model for outputting improved predictions for given sets of input, as described above.

In predicting the workload at 302, optionally at action 318, workload patterns and performance metric information can be provided to the ML model. In an example, predicting component 130, e.g., in conjunction with processor(s) 102, memory/memories 104, operating system 106, etc., can provide the workload patterns and performance metric information to the ML model (e.g., to forecast modeling component 114 or a ML model used by the forecast modeling component 114). For example, predicting component 130 can track performance metrics for a given workload or workload pattern (e.g., additional workload in certain time periods, such as peak hours, peak months, etc.), and can provide this information to the ML model to allow the ML model to consider such features when predicting future workloads for the availability zone.

As described, for example, the various components 110, 120, and/or 130 can continuously perform the actions of method 300 to providing continuous workload predictions over time, to seamlessly and automatically decide worker instance increase in an availability zone in a way that minimizes the allocation system performance and scale issue, and simultaneously allows the allocation system to scale with the increase in the workload. Automatically deciding the number of worker instances in this regard can minimize the throttling, allocation slowness and time out exceptions during VM deployments. In addition, in this regard, the various components 110, 120, and/or 130 can continue to automatically update metrics used in the worker instance count determination, such as daily to minute workload ratio, throughput threshold, etc.

Figure 4:
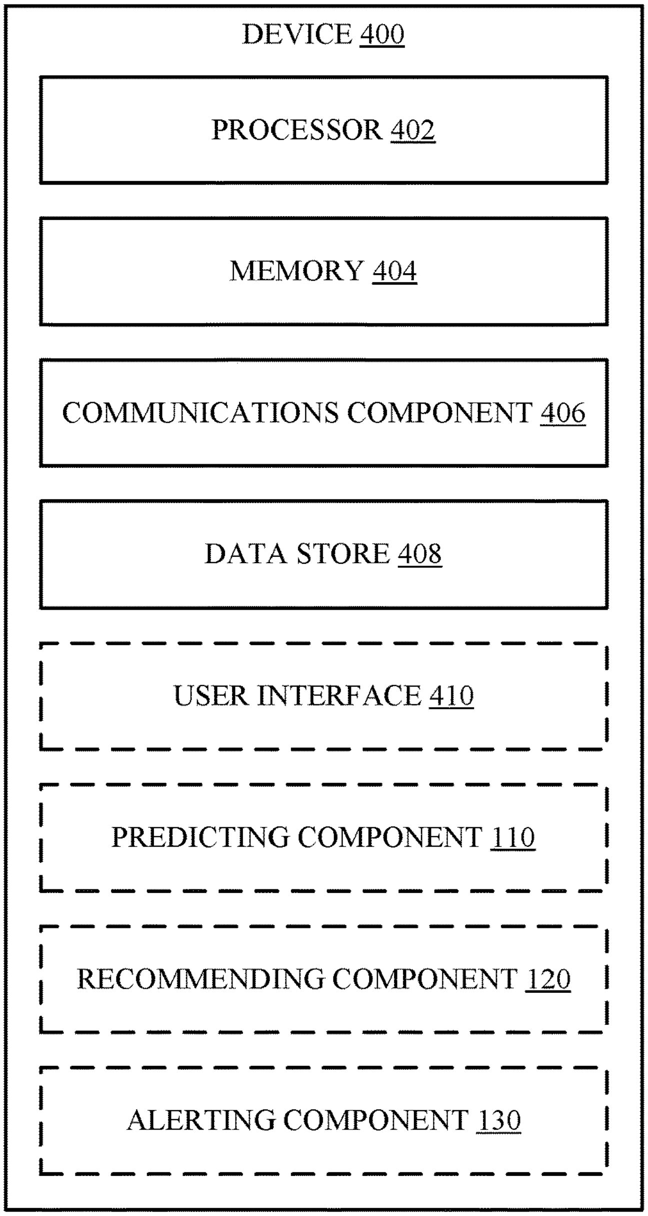
FIG. 4 is a schematic diagram of an example of a device for performing functions described herein, in accordance with aspects described herein.

FIG. 4 illustrates an example of device 400 including additional optional component details as those shown in FIG. 1. In one aspect, device 400 may include processor 402, which may be similar to processor(s) 102 for carrying out processing functions associated with one or more of components and functions described herein. Processor 402 can include a single or multiple set of processors or multi-core processors. Moreover, processor 402 can be implemented as an integrated processing system and/or a distributed processing system.

Device 400 may further include memory 404, which may be similar to memory/memories 104 such as for storing local versions of operating systems (or components thereof) and/or applications being executed by processor 402, such as a predicting component 110, recommending component 120, alerting component 130, etc. Memory 404 can include a type of memory usable by a computer, such as random access memory (RAM), read only memory (ROM), tapes, magnetic discs, optical discs, volatile memory, non-volatile memory, and any combination thereof.

Further, device 400 may include a communications component 406 that provides for establishing and maintaining communications with one or more other devices, parties, entities, etc. utilizing hardware, software, and services as described herein. Communications component 406 may carry communications between components on device 400, as well as between device 400 and external devices, such as devices located across a communications network and/or devices serially or locally connected to device 400. For example, communications component 406 may include one or more buses, and may further include transmit chain components and receive chain components associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with aspects described herein. For example, data store 408 may be or may include a data repository for operating systems (or components thereof), applications, related parameters, etc.) not currently being executed by processor 402. In addition, data store 408 may be a data repository for predicting component 110, recommending component 120, alerting component 130, and/or one or more other components of the device 400.

Device 400 may optionally include a user interface component 410 operable to receive inputs from a user of device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A device for increasing worker instance count for an availability zone in a cloud-based computing platform, comprising:

one or more memories storing instructions; and one or more processors coupled to the one or more memories and configured to execute the instructions to:

provide resource allocation information as input to a machine learning (ML) model to receive an output of a time series forecast of a workload for the availability zone in a future time period, wherein the resource allocation information comprises a history of resource allocation requests for the availability zone including original allocation requests, retry requests that occur when an original allocation request fails, and requests related to underlying platform issues, wherein the ML model is trained on a timespan of workload history for the availability zone such that the time series forecast weighs workload increases due to customer demand over workload increases due to system disruption;

compute a throughput threshold for the worker instances in the availability zone by creating throughput bins from a history of workload data and identifying a throughput bin value at which a number of throttling or timeout exceptions is at least a percentage;

compute a predicted number of worker instances in the availability zone for handling the workload in the future time period based at least in part on the outputted time series forecast and the computed throughput threshold;

when a number of worker instances in the availability zone is less than the predicted number of worker instances, provision a recommended number of servers for the number of worker instances in the availability zone, and process the workload with the provisioned servers at the future time period.

2. The device of claim 1, wherein the one or more processors are further configured to execute the instructions to predict a peak workload over the future time period based on the predicted time series forecast of the workload and a daily to minute peak workload ratio, wherein the predicted number of worker instances is based on the peak workload.

3. The device of claim 2, wherein the one or more processors are further configured to execute the instructions to compute a throughput threshold for the number of worker instances, wherein the predicted number of worker instances is based on a comparison of the throughput threshold with the peak workload.

4. The device of claim 3, wherein the one or more processors are further configured to execute the instructions to compute the throughput threshold based on one or more of a throttling metric, a total allocation time, or a number of timeout exceptions observed from a history of workload data for the availability zone.

5. The device of claim 1, wherein the time series forecast of the workload is based on a history of workload data, statistical trend of the workload data, and one or more properties of a time period related to the workload data.

6. The device of claim 1, wherein the time series forecast is based on a time series prediction model of historical workload data for the availability zone.

7. The device of claim 1, wherein the time series forecast is based on fitting an empirical statistical distribution of a history of resource allocation requests of the availability zone.

8. The device of claim 1, wherein the time series forecast for the availability zone is based on the one or more processors execute the instructions to determine the availability zone is one of multiple availability zones having a threshold confidence for accuracy of predicting the time series forecast.

9. The device of claim 1, wherein the time series forecast is based on the history of resource allocation requests.

10. The device of claim 1, wherein the one or more processors are further configured to execute the instructions to provide, to the ML model, recent workload data for the availability zone and associated performance metrics for use in predicting subsequent time series forecasts of the workload for the availability zone.

11. The device of claim 1, wherein the one or more processors are further configured to execute the instructions to generate the recommendation to increase the number of worker instances further based on one or more of a customer priority of a customer corresponding to the workload, a scalability of the cloud-based computing platform, or a number of throttling failures during deployment of virtual machines in the availability zone.

12. A method for increasing worker instance count for an availability zone in a cloud-based computing platform, comprising:

predicting, using a machine learning (ML) model and by providing resource allocation information as input to the ML model, a time series forecast of a workload for the availability zone in a future time period, wherein the resource allocation information comprises a history of resource allocation requests for the availability zone including original allocation requests, retry requests that occur when an original allocation request fails, and requests related to underlying platform issues, wherein the ML model is trained on a timespan of workload history for the availability zone such that the time series forecast weighs workload increases due to customer demand over workload increases due to system disruption;

computing a throughput threshold for the worker instances in the availability zone by creating throughput bins from a history of workload data and identifying a throughput bin value at which a number of throttling or timeout exceptions is at least a percentage;

determining, based on the throughput threshold, whether a number of worker instances in the availability zone is sufficient for satisfying the workload in the future time period; and based on determining that the number of worker instances is not sufficient, provisioning a recommended number of servers for the number of worker instances in the availability zone, and processing the workload with the provisioned servers at the future time period.

13. The method of claim 12, further comprising predicting a peak workload over the future time period based on the predicted time series forecast of the workload and a daily to minute peak workload ratio, wherein determining whether the number of worker instances is sufficient is based on the peak workload.

14. The method of claim 13, further comprising computing a throughput threshold for the number of worker instances, wherein determining whether the number of worker instances is sufficient based on a comparison of the throughput threshold with the peak workload.

15. The method of claim 14, wherein computing the throughput threshold is based on one or more of a throttling metric, a total allocation time, or a number of timeout exceptions observed from a history of workload data for the availability zone.

16. The method of claim 12, wherein predicting the time series forecast of the workload is based on one or more of a history of workload data, statistical trend of the workload data, and one or more properties of a time period related to the workload data.

17. The method of claim 12, wherein predicting the time series forecast is based on a history of resource allocation requests including initial requests, retries, and requests due to throttled workload.

18. The method of claim 12, wherein generating the recommendation to increase the number of worker instances is further based on one or more of a customer priority of a customer corresponding to the workload, a scalability of the cloud-based computing platform, or a number of throttling failures during deployment of virtual machines in the availability zone.

19. A non-transitory computer-readable device storing instructions thereon that, when executed by at least one computing device, cause the at least one computing device to perform operations for increasing worker instance count for an availability zone in a cloud-based computing platform, comprising:

predicting, using a machine learning (ML) model and by providing resource allocation information as input to the ML model, a time series forecast of a workload for the availability zone in a future time period, wherein the resource allocation information comprises a history of resource allocation requests for the availability zone including original allocation requests, retry requests that occur when an original allocation request fails, and requests related to underlying platform issues, wherein the ML model is trained on a timespan of workload history for the availability zone such that the time series forecast weighs workload increases due to customer demand over workload increases due to system disruption;

computing a throughput threshold for the worker instances in the availability zone by creating throughput bins from a history of workload data and identifying a throughput bin value at which a number of throttling or timeout exceptions is at least a percentage;

determining, based on the throughput threshold, whether a number of worker instances in the availability zone is sufficient for satisfying the workload in the future time period; and based on determining that the number of worker instances is not sufficient, provisioning a recommended number of servers for the number of worker instances in the availability zone, and processing the workload with the provisioned servers at the future time period.

20. The non-transitory computer-readable device of claim 19, the operations further comprising predicting a peak workload over the future time period based on the predicted time series forecast of the workload and a daily to minute peak workload ratio, wherein determining whether the number of worker instances is sufficient is based on the peak workload.

* * * * *